United States Patent
Naito et al.

(10) Patent No.: US 8,852,471 B2
(45) Date of Patent: Oct. 7, 2014

(54) OPTICAL-PARTS MOLDING DIE AND OPTICAL-PARTS MANUFACTURING METHOD

(75) Inventors: Atsushi Naito, Aichi (JP); Naoki Kaneko, Toyokawa (JP); Akihiko Matsumoto, Toyokawa (JP); Kanji Sekihara, Toyokawa (JP); Shinichiro Hara, Toyokawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 487 days.

(21) Appl. No.: 12/376,560

(22) PCT Filed: Jul. 19, 2007

(86) PCT No.: PCT/JP2007/064247
§ 371 (c)(1),
(2), (4) Date: Feb. 5, 2009

(87) PCT Pub. No.: WO2008/018280
PCT Pub. Date: Feb. 14, 2008

(65) Prior Publication Data
US 2010/0176522 A1 Jul. 15, 2010

(30) Foreign Application Priority Data
Aug. 9, 2006 (JP) .................................. 2006-216702

(51) Int. Cl.
*B29D 11/00* (2006.01)
(52) U.S. Cl.
USPC ... 264/2.5; 264/40.6; 264/328.8; 264/328.16; 425/144; 425/547; 425/588

(58) Field of Classification Search
USPC ........... 264/1.1, 2.5, 40.1, 40.6, 328.1, 328.8, 264/328.16; 425/143, 144, 547, 808, 588
See application file for complete search history.

(56) References Cited

U.S. PATENT DOCUMENTS 5,376,317 A * 12/1994 Maus et al. .................. 264/40.6

FOREIGN PATENT DOCUMENTS

| JP | 61-290024 | 12/1986 |
| JP | 3-133616 | 6/1991 |
| JP | 09-254215 | 9/1997 |
| JP | 10-180808 | 7/1998 |
| JP | 2005-088435 | 4/2005 |

* cited by examiner

Primary Examiner — Mathieu D. Vargot
(74) Attorney, Agent, or Firm — Cozen O'Connor (57) ABSTRACT

A die having a plurality of cavities and a temperature sensor for acquiring a temperature value in which the number of the cavities is larger than that of electrothermal conversion elements. When viewed from a direction perpendicular to the surface of a parting line, all cavities and a temperature sensor are arranged in a region occupied by the electrothermal conversion elements. Interval between the outlines of the cavities is smaller than the minimum interval between the outline of the cavity and the electrothermal conversion element, and the shortest distance between the electrothermal conversion element and the temperature measuring portion of a temperature measuring element is shorter than the minimum interval between the outline of the cavity and the electrothermal conversion element.

9 Claims, 6 Drawing Sheets

OPTICAL-PARTS MOLDING DIE AND OPTICAL-PARTS MANUFACTURING METHOD

RELATED APPLICATIONS

This is a U.S. National Phase Application under 35 USC 371 of International Application PCT/JP2007/064247 filed on Jul. 19, 2007.

This application claims the priority of Japanese application no. 2006-216702 filed Aug. 9, 2006, the entire content of which is hereby incorporated by reference.

FIELD OF THE INVENTION

The present invention relates to an optical-parts molding die and an optical-parts manufacturing method used in an injection molding machine to inject resin into the die and to mold optical parts. To put it in greater details, the present invention relates to an optical-parts molding die and optical-parts manufacturing method wherein molding is performed with the die temperature being adjusted.

BACKGROUND OF THE INVENTION

Various types of molded products have been manufactured by an injection molding machine. In the injection molding machine, generally, a molten resin is injected into a cavity formed by a fixed side die and movable side die and is cooled and solidified in the dies to be formed into a molded product. If there is a variation in the molding conditions, or differences occur in the temperature distribution and cooling speed depending on the location in the cavity, variations or distortion may occur to the molded products, and molding failures may occur.

To solve this problem, Patent Document 1, for example, discloses various measures to minimize the irregularity in temperature distribution for molding a long-shaped optical element. For instance, in Example 13 of the Patent Document 1, a molding die wherein a plurality of heaters and a controller for controlling the heaters are provided in the vicinity of the die cavity. It is said that this structure achieves a desired temperature distribution to prevent optical distortion.

However, the aforementioned conventional method is restricted to a long-shaped optical element. Another method of injection molding uses a multiple cavity die wherein a plurality of cavities are formed within one die. In the precision optical parts such an optical lens molded by this method, variations may occur among different molded products for each cavity if there is irregularity in the temperature distribution or cooling speed in the die.

Further, in the continuous molding operation mode, variations in molded products may occur due to a change in the outside temperature for each molding shot. A change in the outside temperature affects the die temperature to produce a subtle change in the molding conditions. Thus, variations in performances of the molded products may occur for each shot, in the conventional art.

Patent Document 1: Japanese Unexamined Patent Application Publication No. 11-42682

DISCLOSURE OF THE INVENTION

The present invention has been made to solve the aforementioned problems of the conventional art. The object of the present invention is to provide an optical-parts molding die and optical-parts manufacturing method wherein the die is a multi-cavity molding die having a plurality of cavities on one surface, the stability of the die temperature is improved, and the irregularity in the temperature distribution in the die is minimized, without being affected much by a change in outside temperature even in the continuous molding operation mode.

The optical-parts molding die of the present invention intended to solve the aforementioned problems is an optical-parts molding die, wherein die clamping operation is performed while adjusting the temperature of the fixed side die and movable side die, and the molding material is injected into the molding space formed therebetween to manufacture optical parts, the aforementioned optical-parts molding die including:

a plurality of cavity portions forming a molding space, and a temperature measuring element for acquiring the temperature value to be used for temperature adjustment;

wherein at least one of the fixed side and movable side dies incorporates an electrothermal conversion element;

the number of the cavity portions is equal to or greater than that of the electrothermal conversion elements; and all the cavity portions and temperature measuring elements are arranged within the area surrounded by the electrothermal conversion elements as viewed from the direction perpendicular to the surface of the parting line.

The present invention also provides an optical-parts manufacturing method, wherein die clamping operation is performed while adjusting the temperature of the fixed side die and movable side die, and the molding material is injected into the molding space formed therebetween to manufacture optical parts, the aforementioned optical-parts molding method using:

a plurality of cavity portions forming a molding space, and a temperature measuring element for acquiring the temperature value to be used for temperature adjustment;

wherein at least one of the fixed side and movable side dies incorporates an electrothermal conversion element;

the number of the cavity portions is equal to or greater than that of the electrothermal conversion elements; and all the cavity portions and temperature measuring elements are arranged within the area occupied by the electrothermal conversion elements as viewed from the direction perpendicular to the surface of the parting line.

BEST MODE FOR CARRYING OUT THE INVENTION

In the optical-parts molding die of the present invention, the temperature value is acquired by the temperature measuring element, and at least one of the fixed side and movable side dies incorporates an electrothermal conversion element. This arrangement allows the temperature to be adjusted between the fixed side and movable side dies when optical parts are manufactured. In this case, the electrothermal conversion elements and temperature measuring elements are characterized in that (1) the number of the cavity portions is equal to or greater than that of the electrothermal conversion elements, and (2) all the cavity portions and temperature measuring elements are arranged within the area occupied by the electrothermal conversion elements.

To be more specific, the electrothermal conversion elements whose number is equal to or less than that of the cavity portions are arranged so as to surround all the cavity portions and temperature measuring elements. This arrangement eliminates the influence of the disturbances such as ambient temperature. In this case, the area occupied by the electrothermal conversion elements can be defined as an assembly of all the line segments formed by connecting arbitrary two points of the electrothermal conversion element. When the electrothermal conversion elements are annular or are shaped in an interrupted annular configuration, the area corresponds to the enclosed area. The surface of the parting line is defined as the surface brought in contact with or separated from the fixed side and movable side dies.

In the present invention, as viewed from the direction perpendicular to the surface of the parting line, the interval between the exteriors of the cavity portions is preferably smaller than the minimum interval between the exterior of the cavity portion and electrothermal conversion element. The minimum distance between the electrothermal conversion element and temperature measuring portion of the temperature measuring element is preferably smaller than the minimum interval between the exterior of the cavity portion and electrothermal conversion element.

In the present invention, furthermore, (3) the interval between the exteriors of the cavity portions is smaller than the minimum interval between the exterior of the cavity portion and electrothermal conversion element, and (4) the minimum distance between the electrothermal conversion element and temperature measuring portion of the temperature measuring element is smaller than the minimum interval between the exterior of the cavity portion and electrothermal conversion element.

To be more specific, the electrothermal conversion elements are arranged away from the cavity portion on the outer peripheral side of the cavity portion. This arrangement allows the variations in temperature among cavities to be suppressed even in the multi-cavity die. Further, the temperature measuring elements are not intended to measure the temperature of the cavity portion, and are arranged closer to rather the electrothermal conversion elements. Thus, the stability of the die temperature can be improved without being affected directly by the temperature of the injected resin. These features provide a multi-cavity die having a plurality of cavities on one surface, which is an optical-parts molding die wherein the stability of the die temperature is improved and the irregularity in temperature distribution on the die is suppressed, without being affected much by a change in the outside temperature even in the continuous molding operation mode. In this case, the distance or interval between the electrothermal conversion element and another member indicates the distance from the surface on the cavity side of the heat-generating portion of the electrothermal conversion element.

In the present invention, the length of the molding space formed in the cavity portion in the direction of perpendicular to surface of the parting line is preferably smaller than the minimum distance between the outline surface of the molding space and the temperature measuring element. This arrangement ensures the temperature measuring element to be less susceptible to the temperature of the molten resin injected into the cavity. Thus, a stable die temperature can be obtained even in the continuous molding operation mode.

Further, in the present invention, the electrothermal conversion elements are preferably annular or are shaped in an interrupted annular configuration, as viewed from the direction perpendicular to the surface of the parting line. This structure ensures the stability of the die temperature to be improved without being affected much by a change in the outside temperature. In this case, the annular shape is not restricted to a circular form. It includes a polygonal shape and curved line annular shape other than a circle.

Further, in the present invention, both the fixed side and movable side dies preferably include electrothermal conversion elements. This structure permits simultaneous adjustment of temperatures of the cavities of both the fixed side and movable side dies, and provides further stabilization of the die temperature.

Further, in the present invention, the number of the electrothermal conversion elements is preferably equal to that of the temperature measuring elements. If each of the electrothermal conversion elements is equipped with one temperature measuring element, the electrothermal conversion elements can be easily controlled.

Further, the present invention provides an optical-parts manufacturing method wherein, as viewed from the direction perpendicular to the surface of the parting line, the interval between the exteriors of the cavity portions is smaller than the minimum interval between the exterior of the cavity portion and the electrothermal conversion element, and the minimum distance between the electrothermal conversion element and the temperature measuring portion of the temperature measuring element is smaller than the minimum interval between the exterior of the cavity portion and electrothermal conversion element.

Referring to attached drawings, the following describes the details of the best form of embodiment of the present invention. This embodiment applies the present invention to the optical-parts molding die for producing small parts such as the lens of a camera mounted on a mobile terminal, by multi-cavity molding method. This embodiment is particularly suited for injection molding of high-precision optical parts.

Figure 1:
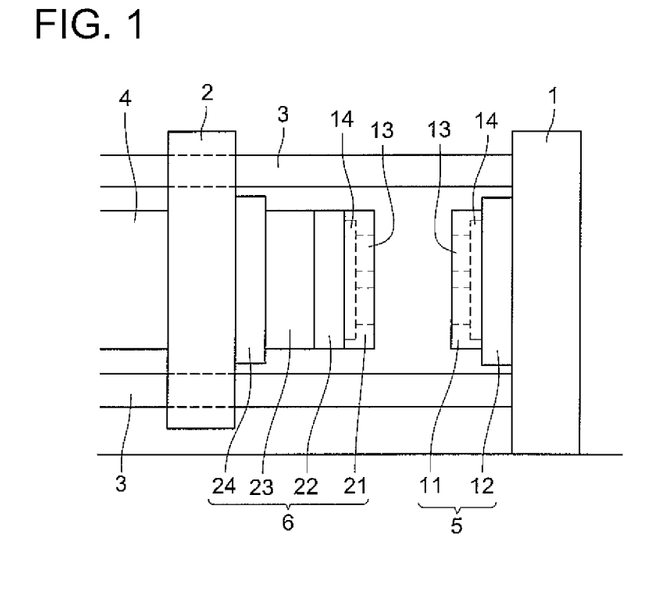
FIG. 1 is a side view representing the major components of the injection molding machine of the present embodiment.

As shown in FIG. 1, the major components of the injection molding machine on which the die of the present invention is mounted include a fixed side platen 1 fixed on a pedestal and a movable side platen 2 which can be moved to or away from the fixed side platen 1. A plurality of tie bars 3 penetrating the movable side platen 2 and parallel to each other are provided, and one end of each of the tie bars 3 is fixed to the fixed side platen 1. Further, a drive section 4 is arranged on the left of the movable side platen 2 in the drawing to move the movable side platen 2 forward and backward in the lateral direction of the drawing. Further, the fixed side platen 1 is equipped with a fixed side die 5, and the movable side platen 2 is provided with a movable side die 6.

As shown in FIG. 1, the fixed side die 5 contains a fixed side template 11 and fixed side mounting plate 12. As shown in FIG. 1, the movable side die 6 includes a movable side template 21, a movable side holder plate 22, a spacer block 23, and a movable side mounting plate 24. Cavities are formed on the left end of the fixed side template 11 in the drawing and on the right end of the movable side template 21 in the drawing so as to face each other. The object of the present embodiment is restricted to the case wherein a plurality of (four or more in particular) cavities 13 are formed in the template, as shown in FIG. 2 for example.

In this injection molding machine, die clamping operation is performed by the movable side die 6 being moved to the right of the drawing by the drive section 4. In this case, the space formed between the two cavities 13 is the molding space. Further, the fixed side platen 1 is provided with an inlet for injecting the molten resin. In the clamped condition, a resin as a molding material is injected into the molding space of the die from the right of FIG. 1, whereby optical parts are produced.

In the clamped condition, the left end face of the fixed side template 11 is joined the right end face of the movable side template 21 whereby a line is formed. This division line is called the parting line. Further, each of the left end face of the fixed side template 11 and the right end face of the movable side template 21 which is a division surface is called a parting line surface. In this case, the lateral direction of FIG. 1 corresponds to the direction perpendicular to the surface of the parting line.

Figure 2:
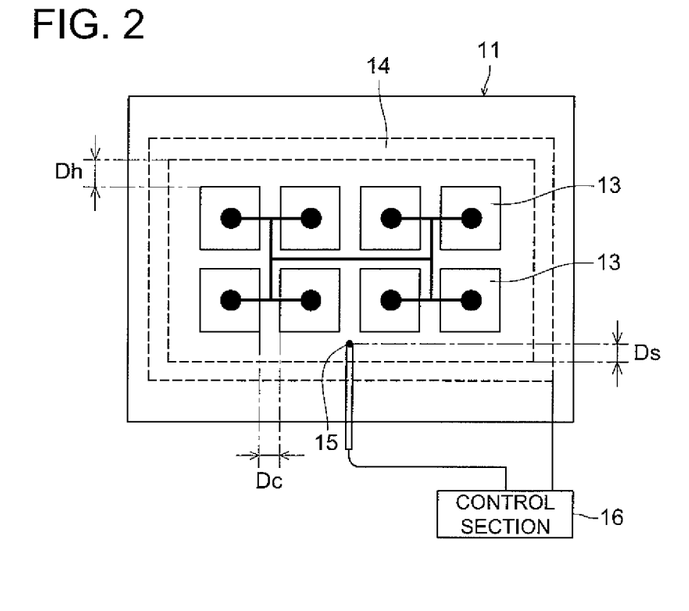
FIG. 2 is an explanatory diagram representing the arrangement of cavities, an electrothermal conversion element and a temperature sensor.

As viewed from the left of FIG. 1, the fixed side template 11 of this embodiment is provided with eight cavities 13, as shown in FIG. 2. This shows an example of the fixed side template 11 for eight-cavity molding in an orthogonal array, wherein eight cavities 13 are arranged in such a way that four cavities 13 are placed in two steps. The electrothermal conversion elements 14 arranged so as to surround all the cavities 13 and temperature sensors 15 as temperature measuring elements are arranged in its vicinity. Further, there is also a controller 16 provided to control electrothermal conversion elements 14 in response to the result of detection by the temperature sensor 15. The movable side template 21 is also formed in the similar structure.

As shown in FIG. 2, the electrothermal conversion elements 14 are arranged so as to surround all the cavities 13 in a rectangular shape. The electrothermal conversion elements 14 can be wound with a thermoelectric wire, for example, as the one disclosed in the FIGS. 27 through 32 of the Patent Document 1. Alternatively, it is also possible to put a thermoelectric wire into a casing of a rectangular frame, and to perform casting in the fixed side template 11, whereby electrothermal conversion elements 14 are produced. The temperature sensor 15 can be a commonly used sensor such as a thermocouple. The temperature sensor 15 is arranged adjacent to the electrothermal conversion element 14 in the middle of the fixed side template 11 in the lateral direction of FIG. 2. To put it another way, the temperature sensor 15 is located slightly away from the cavities 13.

In response to the result of detection by the temperature sensor 15, the controller 16 controls the current value to be supplied to the electrothermal conversion elements 14. When there are a plurality of electrothermal conversion elements 14, a temperature sensor 15 is provided for each of the electrothermal conversion elements 14. Thus, the electrothermal conversion elements 14 are subjected to a closed control by the temperature sensor 15 and controller 16. It should be noted that a thyristor based on PID control can be used for temperature adjustment. For example, a thyristor based on the conventionally known PID control can be used to perform control described in the Japanese Unexamined Patent Application Publication No. 2000-347746. Further, a phase control system is preferably utilized.

The object of the present embodiment is restricted to the multi-cavity molding method wherein four or more cavities 13 are arranged within one template. The number of the electrothermal conversion elements 14 in the template is smaller than that of the cavities 13 arranged in the die, preferably equal to or less than half that of the cavities 13. In the example given in FIG. 2, the number of electrothermal conversion elements 14 is one. All cavities 13 and temperature sensors 15 are incorporated within the area occupied by the electrothermal conversion elements 14, as viewed from the direction perpendicular to the parting line.

In this case, the area occupied by the electrothermal conversion element 14 can be defined as an assembly of all the line segments formed by connecting arbitrary two points of the electrothermal conversion element. When the electrothermal conversion elements 14 are annular or are shaped in an interrupted annular configuration, the area corresponds to the enclosed area. To put it another way, as shown in FIG. 2, the electrothermal conversion elements 14 is preferably arranged so as to enclose the entire periphery of the cavities 13. Alternatively, only the two top and bottom sides or only the two right and left sides in the quadrilateral electrothermal conversion elements 14 of FIG. 2 can be used. It should be noted, however, that arrangement of only the two adjacent sides is not preferred. Uniform arrangement as a whole is preferred.

In the present embodiment, arrangement is so made that the distance between members will meet the following relationship. As shown in FIG. 2, when viewed from the direction perpendicular to the parting line, assume that the distance between the exteriors of the cavities 13 is Dc; the minimum interval between the exterior of the cavity 13 and electrothermal conversion element 14 is Dh; and the minimum distance between the electrothermal conversion element 14 and the temperature measuring portion of the temperature sensor 15 is Ds. The electrothermal conversion elements 14 and temperature sensors 15 are arranged so that the following two formulas will hold:

$$Dc<Dh$$

$$Ds<Dh$$

Figure 3:
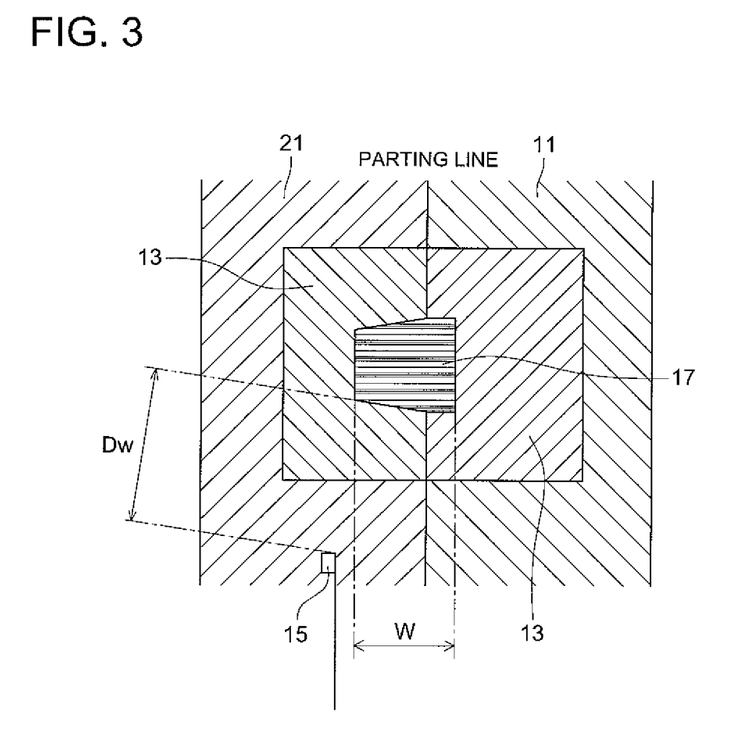
FIG. 3 is an explanatory diagram showing the arrangement of the temperature sensor.

Further, when the die is clamped, as shown in FIG. 3 a molding space 17 is formed between the cavities 13 of the fixed side template 11 and the cavities 13 of the movable side template 21 as viewed from the direction parallel to the parting line. FIG. 3 shows the cross section perpendicular to the parting line subsequent to die clamping. Resin is injected into this molding space 17. Assume that the width in the lateral direction of the molding space 17 in FIG. 3 is W, and the minimum distance between the outline surface of the molding space 17 and the temperature sensor 15 is Dw. To be more specific, W is equivalent to the length of the molding space 17 in the direction perpendicular to the parting line. The temperature sensor 15 is installed at the position wherein the following formula holds:

$$W<Dw$$

To be more specific, the distance between the electrothermal conversion element 14 and cavity 13 is greater than the distance between the cavities 13. The temperature sensor 15 is located closer to the electrothermal conversion element 14 than the cavities 13 is. In this case, the temperature sensor 15 is located further away from the molding space by the distance greater than the thickness of the molding space in the direction perpendicular to the parting line. The temperature sensor 15 is preferred to be arranged between the cavities 13 and electrothermal conversion element 14.

The electrothermal conversion elements 14 are arranged to heat the group of the cavities 13 collectively, without being arranged in a form corresponding to each cavity 13. The group of the cavities 13 is collectively arranged at the position relatively closer to the center within the area enclosed by the electrothermal conversion elements 14. The position of the cavities 13 is not immediately adjacent to the electrothermal conversion elements 14, and therefore, the temperature gradient is gentle in this area.

The temperature sensor 15 detects rather the template temperature between the cavities 13 and electrothermal conversion elements 14, not the temperature of each cavity 13. With consideration given to the width of the molding space as the wall thickness of the molded product, the temperature sensor 15 is located away from the molding space by a distance greater than that width. After this arrangement, the controller 16 controls the value of current supplied to the electrothermal conversion elements 14, based on the result of detection of the temperature sensor 15. Control is provided until the detected temperature is kept within a predetermined temperature range.

The aforementioned procedure ensures approximately uniform temperature control as a whole even in the multi-cavity molding die wherein a plurality of cavities 13 are formed on one surface. To put it another way, this procedure eliminates the local temperature rise or fall of some of the cavities 13. Further, the temperature sensor 15 is not susceptible to the temperature of the molten resin charged into the cavities 13. Particularly, this procedure is characterized in that the detection value is stabilized against the fluctuation in die temperature under the influence of the nozzle temperature of the molding machine and resin temperature immediately after the start of molding. This arrangement does not allow the temperature of the electrothermal conversion elements 14 to be directly detected. Because of this arrangement, it is sufficient to install one temperature sensor 15 to each of the electrothermal conversion elements 14.

Figure 4:
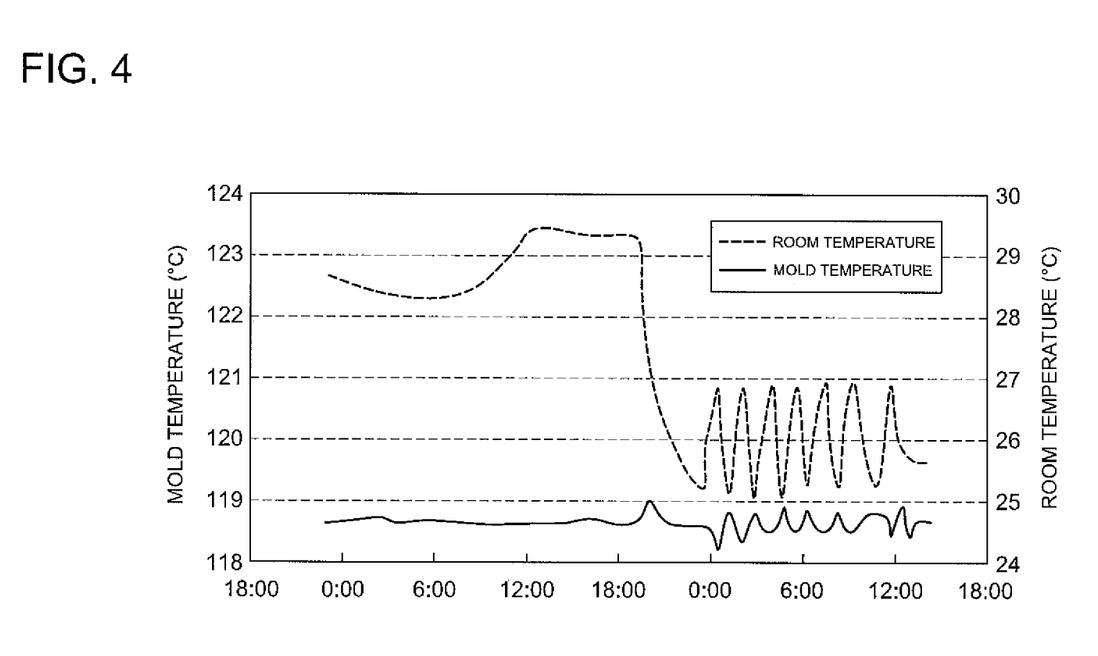
FIG. 4 is a chart representing a change in die temperature in response to a change of outside temperature.

Further, the cavities 13 are arranged so as to be surrounded by the electrothermal conversion elements 14. This suppresses the influence of changes in ambient temperature. FIG. 4 shows the changes in die temperature with respect to changes in room temperature. In FIG. 4, changes in room temperature are shown by a broken line and correspond to the scale of the vertical axis on the right. A solid line indicates the changes in die temperature using the temperature adjustment technique of the present invention. These changes correspond to the scale of the vertical axis on the left.

As shown in FIG. 4, the room temperature rises during the period from 6:00 to 12:00. A sharp fall is recorded after 18:00. This is due to the normal operation of the air conditioners used to adjust the room temperature. Further, after about 23:30, the room temperature exhibits fluctuations of short periods within the range of about 2° C. This is because the intermittent operation of the air conditioner was performed intentionally for test purposes. By contrast, the range of fluctuations in the die temperature is small. The range of fluctuation in the die temperature is less than 1° C. despite big changes in the room temperature after 18:00. Although there is some conformance to the subsequent short-period changes in room temperature, the range of fluctuation thereof is about ±0.5° C. As shown in this diagram, according to the die of the present embodiment, influence on the die temperature is small, despite changes in room temperature. To put it another way, there is no direct influence of the temporary temperature changes and abrupt temperature changes, and therefore, stable temperature control is provided.

The aforementioned arrangement suppresses the die temperature fluctuation during the continuous molding operation, with the result that the quality variations among molding shots, and differences in the performances among cavities can be minimized. A further advantage is that, even when independent control is used among a plurality of channels, there is no possibility of the size of the apparatus being increased or the structure becoming more complicated, differently from the case of employing the external temperature adjustment method based on oil use.

Figure 5:
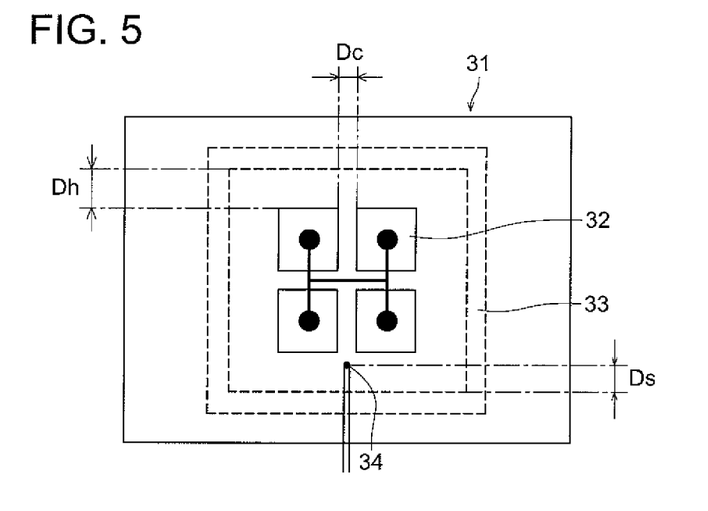
FIG. 5 is an explanatory diagram showing another example of the arrangement of cavities, an electrothermal conversion element and a temperature sensor.
Figure 6:
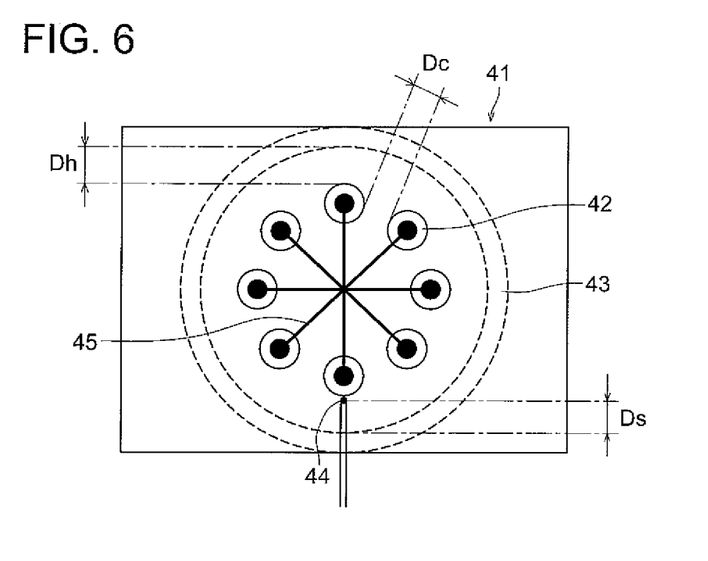
FIG. 6 is an explanatory diagram showing a further example of the arrangement of cavities, an electrothermal conversion element and a temperature sensor.
Figure 7:
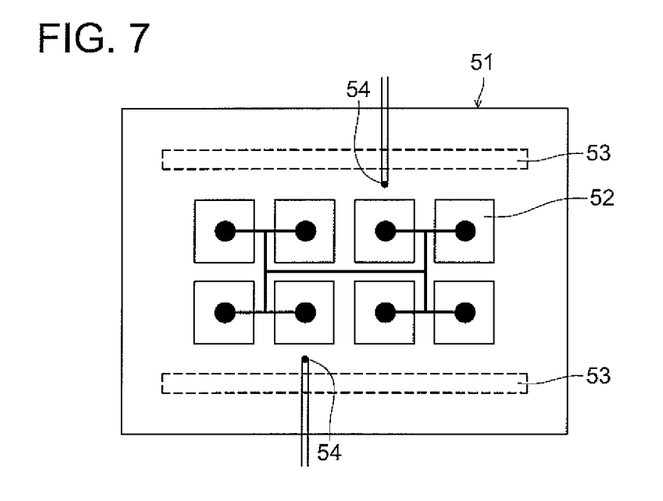
FIG. 7 is an explanatory diagram showing a still further example of the arrangement of cavities, electrothermal conversion elements and temperature sensors.

FIGS. 5, 6 and 7 show further examples of the cavities 13, electrothermal conversion elements 14 and temperature sensors 15. FIG. 5 shows an example of the four-cavity molding in an orthogonal array. Four cavities 32 are arranged in an orthogonal array on the fixed side template 31. Approximately regularly square electrothermal conversion elements 33 are arranged so as to surround the cavities. Temperature sensors 34 are located between the cavities 32 and electrothermal conversion elements 33. In this example, the electrothermal conversion elements 33 are placed further away from the cavities 32 by the distance greater than the interval Dc between the exteriors of the cavities 32. One electrothermal conversion element 33 and one temperature sensor 34 are arranged for four cavities 32.

FIG. 6 shows an example of eight-cavity molding wherein eight cavities are arranged in a radial configuration. Runners 45 radially extending from the center are formed on the fixed side template 41. The front end of each runner 45 is provided with a circular cavity 42. An approximately circular electrothermal conversion element 43 is provided so as to surround them. A temperature sensor 44 is located between the cavity 42 and electrothermal conversion element 43. In this case, one electrothermal conversion element 43 and one temperature sensors 44 are provided for eight cavities 42.

Figure 8:
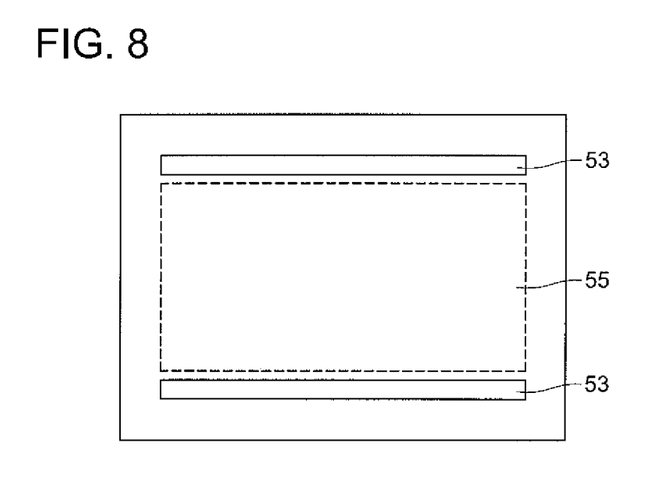
FIG. 8 is an explanatory diagram showing the area occupied by the electrothermal conversion elements.

FIG. 7 shows an example of eight-cavity molding. Eight cavities 52 are arranged on the fixed side template 51 in an orthogonal array. In this example, two electrothermal conversion elements 53 are arranged. In this case, the number is assumed as one as a whole even in the case shown in FIGS. 29 through 32 of the Patent Document 1. A temperature sensor 54 is arranged in the vicinity of each of the electrothermal conversion elements 53. When the electrothermal conversion elements cannot be placed so as to surround all the cavities 52 because of the space or other reasons, it is sufficient if all the cavities 52 and temperature sensor 54 can be arranged within the area 55 occupied by the electrothermal conversion elements 53, as shown in FIG. 8. The arrangement of the electrothermal conversion elements 53 shown in FIG. 7 exhibits an example of the interrupted annular configuration. The electrothermal conversion elements 53 are preferably placed under closed control based on the detected value of each of the temperature sensors 54 arranged in the vicinity thereof.

The following describes the method of manufacturing optical parts using the die of the present embodiment in an injection molding machine. In the first place, the electrothermal conversion elements 14 are controlled by the controller 16 so that the fixed side die 5 and movable side die 6 are kept within a predetermined temperature range. This control suppresses the temperature variation among different cavities 13, as described above. At the same time, stable temperature control is conducted to provide insusceptibility to the influence of the changes in the outside temperature. Under this temperature control, the movable side platen 2 is driven by the drive section 4, and die clamping operation is performed. With the die clamped, a molten resin is injected from outside the fixed side platen 1.

The injected resin is fed into the molding space inside the cavities 13 through the flow path having been formed. This injected resin is cooled and solidified inside the cavities 13. After it has been solidified, the product is taken out, whereby the optical parts are manufactured. In this case, the die temperature is placed under stable control, and the variations of the products among different cavities 13 are eliminated. Further, due to insusceptibility to the influence of the outside temperature, variations in performances for each molding shot are also eliminated when the aforementioned operation is repeated in a continuous molding operation mode. The resin preferably used for molding includes polyolefin-, polycarbonate-, polyester-, acryl-, norbornane- and silicon-based resins.

As has been described in details, the die of the injection molding machine of the present embodiment is the multi-cavity molding die containing four or more cavities 13 on one surface. The electrothermal conversion elements 14 are arranged in the number smaller than that of the cavities 13 in such a way that all the cavities 13 are surrounded by the electrothermal conversion elements 14, or all the cavities 13 are included within the occupied area if not surrounded. This structure provides insusceptibility to outside temperature. The electrothermal conversion element 14 is arranged further away from the cavities 13 by the distance greater than the interval between the cavities 13. This arrangement suppresses the variation of temperature among different cavities 13, and provides stable die temperature control. Further, one temperature sensor 15 is installed for each of the electrothermal conversion elements 14 at the position closer to the electrothermal conversion elements 14, whereby easy control is ensured. This structure provides a multi-cavity injection molding die having a plurality of cavities 13 on one surface and this die is characterized by improved stability of the die temperature, minimized irregularity of temperature distribution in the die and insusceptibility to changes in outside temperature in the continuous molding operation mode.

It is to be expressly understood, however, that the present embodiment is only an example, without the present invention being restricted thereto. The present invention can be improved or modified in a great number of variations, without departing from the technological spirit and scope of the invention claimed.

Figure 9:
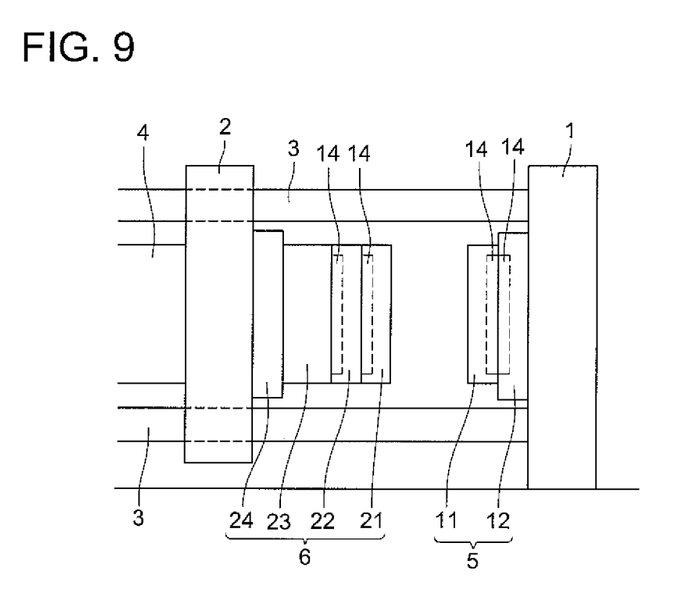
FIG. 9 is an explanatory diagram showing another example of the arrangement of the electrothermal conversion elements.

For example, in the description of the aforementioned embodiment, the fixed side die 5 and movable side die 6 are provided with an electrothermal conversion element 14 and temperature sensor 15. As shown in FIG. 9, however, the similar structure is applied to the fixed side mounting plate 12 and/or movable side holder plate 22, whereby more stable temperature control is provided. The platen temperature adjustment can also be employed additionally. In the present embodiment, the electrothermal conversion element is exemplified as being quadrilateral and circular. The electrothermal conversion element can be polygonal, polygonal with rounded corners, oblong and of other shapes. The electrothermal conversion element 14 can be placed in a desired arrangement along the thickness of the templates 11 and 21. This embodiment is most preferably applicable to the cases wherein four or more cavities are provided on one surface, and the optical parts to be produced are required to have an optical surface roughness of equal to or less than Ra 20 nm.

What is claimed is:

1. An optical-parts molding die comprising:
   a fixed side die; and
   a movable side die,
   wherein die clamping operation is performed while adjusting temperatures of the fixed side die and the movable side die and a molding material is injected into a molding space formed therebetween to manufacture optical parts, the optical-parts molding die further comprising:
   a plurality of cavity portions each forming the molding space; and
   at least one temperature measuring element for acquiring a temperature value to be used for a temperature adjustment, the at least one temperature measuring element being arranged outside of each of the plurality of cavity portions as viewed from a direction perpendicular to a surface of a parting line between the fixed side die and the movable side die,
   wherein at least one of the fixed side die and the movable side die includes at least one electrothermal conversion element for heating the plurality of cavity portions, and a number of the plurality of cavity portions is equal to or greater than a number of the at least one electrothermal conversion element,
   wherein all of the plurality of cavity portions and the at least one temperature measuring element are arranged within an area occupied by the at least one electrothermal conversion element as viewed from a direction perpendicular to a surface of the parting line;
   wherein, as viewed from the direction perpendicular to the surface of the parting line, an interval between exteriors of the plurality of cavity portions is smaller than a minimum interval between the exteriors of the plurality of cavity portions and the at least one electrothermal conversion element, and
   wherein, as viewed from the direction perpendicular to the surface of the parting line, a minimum distance between the at least one electrothermal conversion element and a temperature measuring portion of the at least one temperature measuring element is smaller than a minimum interval between the exteriors of the plurality of cavity portions and the at least one electrothermal conversion element.

2. The optical-parts molding die of claim 1, wherein a length of the molding space formed in each of the plurality of cavity portions in the direction perpendicular to the surface of the parting line is smaller than a minimum distance between an outline surface of the molding space and the at least one temperature measuring element.

3. The optical-parts molding die of claim 1, wherein the at least one electrothermal conversion element is one of annular and shaped in an interrupted annular configuration, as viewed from the direction perpendicular to the surface of the parting line.

4. The optical-parts molding die of claim 1, wherein the fixed side die and the movable side die include the at least one electrothermal conversion element.

5. The optical-parts molding die of claim 1, wherein a number of the at least one electrothermal conversion element is equal to a number of the at least one temperature measuring element.

6. An optical-parts manufacturing method, in which die clamping operation is performed while adjusting temperatures of a fixed side die and a movable side die, and a molding material is injected into a molding space formed therebetween to manufacture optical parts, the optical-parts molding method using,
   the fixed side die and the movable side die having
   a plurality of cavity portions each forming a molding space, and at least one temperature measuring element configured to acquire a temperature value to be used for a temperature adjustment, the at least one temperature measuring element being arranged outside of each of the plurality of cavity portions as viewed from a direction perpendicular to a surface of a parting line between the fixed side die and the movable side die, wherein at least one of the fixed side die and the movable side die includes at least one electrothermal conversion element for heating the plurality of cavity portions, and a number of the plurality of cavity portions is equal to or greater than a number of the at least one electrothermal conversion element, wherein all of the plurality of cavity portions and the at least one temperature measuring element are arranged within an area occupied by the at least one electrothermal conversion element as viewed from a direction perpendicular to a surface of a parting line;

wherein, as viewed from the direction perpendicular to the surface of the parting line, an interval between exteriors of the plurality of cavity portions is smaller than a minimum interval between the exteriors of the plurality of cavity portions and the at least one electrothermal conversion element, and wherein, as viewed from the direction perpendicular to the surface of the parting line, a minimum distance between the at least one electrothermal conversion element and a temperature measuring portion of the at least one temperature measuring element is smaller than the minimum interval between the exteriors of the plurality of cavity portions and the at least one electrothermal conversion element.

7. The optical-parts molding die of claim 1, wherein each of the at least one electrothermal conversion element is arranged to surround the plurality of cavity portions.

8. The optical-parts manufacturing method of claim 6, wherein each of the at least one electrothermal conversion element is arranged to surround the plurality of cavity portions.

9. The optical-parts manufacturing method of claim 6, wherein a length of the molding space formed in each of the plurality of cavity portions in the direction perpendicular to the surface of the parting line is smaller than a minimum distance between an outline surface of the molding space and the at least one temperature measuring element.

* * * * *